US006927396B2

(12) United States Patent
Vydrin et al.

(10) Patent No.: US 6,927,396 B2
(45) Date of Patent: Aug. 9, 2005

(54) HIGH-SPEED PULSE DISCRIMINATING GAMMA RAY CAMERA

(75) Inventors: Viatcheslav Vydrin, Pittsburgh, PA (US); Robert K. Davis, Pittsburgh, PA (US); Joseph Grosholz, Jr., Natrona Heights, PA (US); Kevin B. Parnham, Acton, CA (US)

(73) Assignee: II-VI Incorporated, Saxonburg, PA (US)

( * ) Notice: Subject to any disclaimer, the term of this patent is extended or adjusted under 35 U.S.C. 154(b) by 162 days.

(21) Appl. No.: 10/399,810

(22) PCT Filed: Oct. 24, 2001

(86) PCT No.: PCT/US01/45284

§ 371 (c)(1),
(2), (4) Date: Aug. 26, 2003

(87) PCT Pub. No.: WO02/057807

PCT Pub. Date: Jul. 25, 2002

(65) Prior Publication Data

US 2004/0129887 A1 Jul. 8, 2004

Related U.S. Application Data

(60) Provisional application No. 60/242,942, filed on Oct. 24, 2000.

(51) Int. Cl.[7] .............................................. G01T 1/00
(52) U.S. Cl. ....................................... 250/367; 250/366
(58) Field of Search .......................... 250/367, 370.09, 250/366, 368, 370.02, 370.03, 370.08, 208.1; 378/62; 382/128, 132

(56) References Cited

U.S. PATENT DOCUMENTS

| 5,363,454 A | | 11/1994 | Udagawa et al. |
| 5,665,969 A | | 9/1997 | Beusch |
| 5,742,659 A | | 4/1998 | Atac et al. |
| 5,943,388 A | * | 8/1999 | Tumer ........................ 378/98.9 |
| 6,248,990 B1 | | 6/2001 | Pyyhtia et al. |
| 6,671,394 B1 | * | 12/2003 | Sako ........................... 382/132 |
| 2004/0146189 A1 | * | 7/2004 | Langan ....................... 382/128 |
| 2004/0195512 A1 | * | 10/2004 | Crosetto ................. 250/363.04 |
| 2004/0212708 A1 | * | 10/2004 | Spartiotis et al. ........... 348/295 |

* cited by examiner

*Primary Examiner*—David Porta
*Assistant Examiner*—Otilia Gabor
(74) *Attorney, Agent, or Firm*—The Webb Law Firm

(57) ABSTRACT

A gamma ray camera A includes a crystal array S which includes a plurality of pixels 4 each of which outputs a pixel signal in response to receiving a gamma ray. A first circuit (6, 8, 10, 12, 14 and 22) outputs for each pixel 4 of the crystal array S, when a pixel signal output by the pixel 4 has a predetermined relation to a reference signal, a threshold signal related to the position of the pixel 4 in the crystal array S. A second circuit (18, 20, 24, 26, 28, 30 and 32) outputs a counter value for each pixel signal having a predetermined relation to its threshold signal. Lastly, a third circuit 34 accumulates for each pixel 4 of the crystal array S a count of the counter values output by the second circuit (18, 20, 24, 26, 28, 30 and 32) for the pixel 4.

19 Claims, 4 Drawing Sheets

HIGH-SPEED PULSE DISCRIMINATING GAMMA RAY CAMERA

This application claims the benefit of Provisional Application No. 60/242,942, filed Oct. 24, 2000.

BACKGROUND OF THE INVENTION

1. Field of the Invention

The present invention relates to gamma ray cameras and, more particularly, to processing gamma ray events detected by gamma ray cameras.

2. Brief Description of the Prior Art

Gamma ray cameras having radiation detectors have been utilized to form images of objects for many years. Typically, such devices are large and require specialized installations in order to function. Recently, the development of new radiation detectors has opened possibilities for the development of hand-held, portable cameras. These portable cameras, however, have difficulty in effectively transmitting data regarding detected radiation events to an external imaging system. Specifically, prior art gamma ray cameras generate both pixel address and pulse amplitude information and transmit both to the external imaging system. In applications where the radiation event rate is high, large amounts of data must be processed and transmitted. This requires either pulse processing hardware at the gamma ray camera in order to reduce the amount of data to be transmitted or the use of a very high bandwidth in order to transmit the required amount of information.

The addition of pulse processing hardware increases the complexity and power consumption of the camera, thus requiring either cooling or the use of a larger enclosure. The transmission of all data requires the use of state-of-the-art data and transmission devices and protocols, and even then places a limit on the amount of information that can be transmitted. Additionally, the use of such cameras precludes using the imaging head in a wireless mode (typically infrared transmitters) because they cannot handle the necessary data transfer rate.

One known device for processing radiation events is disclosed in U.S. Pat. No. 6,248,990. In this device, individual pixels of an image cell or array directly generate a charge in response to incident high energy radiation. Each pixel of the image cell array is coupled to an image cell circuit of a counting substrate. Each image cell circuit includes counting circuitry configured to count plural radiation hits incident on the corresponding pixel of the image cell array when a radiation hit is between a high and a low threshold value. A problem with this device is the use of a common high and low threshold value for each pixel of the image cell array regardless of the sensitivity of the pixel to incident radiation hits. Since the sensitivity of individual pixels of an image cell array can vary up to 15%, the use of fixed high and low threshold values with all of the pixels can result in the detection of radiation hits for one or more pixels that are outside the high and low threshold values for another pixel. Thus, the resulting image can include a significant amount of undesirable noise.

It is, therefore, an object of the present invention to overcome the above problems and others by providing an apparatus and method for processing gamma ray events detected by a gamma ray camera in a manner that reduces the amount of data, including noise data, that is transferred to an external imaging system for processing and conversion into an image. Still other objects will become apparent to those of ordinary skill in the art upon reading and understanding the following detailed description.

SUMMARY OF THE INVENTION

Accordingly, we have invented an apparatus for processing gamma ray events. The apparatus includes a pixilated crystal array with each pixel of the crystal array responsive to a gamma ray received thereby for outputting a pixel signal related to the energy of the received gamma ray. The apparatus includes a means responsive to each pixel signal for outputting a first threshold signal and a second threshold signal related to a position of each pixel in the crystal array when the pixel signal has a predetermined relation to a reference signal. A means responsive to each pixel signal and its related first and second threshold signals is provided for outputting a counter value when the pixel signal has a predetermined relation to the first and second threshold signals. All event counter has an array of registers each of which is related to one of the pixels of the crystal array. The event counter is responsive to each counter value for incrementing a value of the register related to the pixel of the crystal array outputting the pixel signal related to the counter value. Lastly, a means is provided for displaying the values in the registers as an image.

The means for outputting the first and second threshold signals preferably includes a preamplifier responsive to each pixel signal output by a pixel of the crystal array for outputting for each pixel signal a voltage related to the energy of the received gamma ray. A threshold comparator is responsive to each voltage output by the preamplifier having a predetermined relation to the reference signal for outputting for each voltage a unique trigger signal. A channel address decoder responsive to each trigger signal is provided for outputting for each unique trigger signal a unique address signal. A means responsive to each address signal is provided for outputting for each address signal related first and secondary binary sequences. Lastly, a means responsive to each first and second binary sequence is provided for outputting the first and second threshold signals. Preferably, the means for outputting the first and second binary sequences includes first and second random access memories and the means for outputting the respective first and second threshold signals includes first and second digital-to-analog converters.

The first and second threshold signals can be first and second voltage thresholds and the means for outputting a counter value can include means for comparing a voltage related to the pixel signal to the first and second voltage thresholds. The means for comparing outputs a first trigger signal related to the comparison of the voltage related to the pixel signal to the first threshold voltage and outputs a second trigger signal related to the comparison of the voltage related to the pixel signal to the second threshold voltage. An event detector outputs the counter value as a function of the first and second trigger signals. Preferably, the means for comparing includes first and second comparators for comparing the first and second voltage thresholds, respectively, to the voltage related to the pixel signal.

We have also invented an apparatus for processing gamma ray events detected by a crystal array which includes a plurality of pixels each of which outputs a pixel signal in response to receiving a gamma ray. The apparatus includes a first circuit which outputs for each pixel of the crystal array, when a pixel signal output by the pixel has a predetermined relation to a reference signal, a threshold signal related to the position of the pixel in the crystal. A second circuit outputs a counter value for each pixel signal having a predetermined relation to its threshold signal. Lastly, a third circuit accumulates for each pixel of the crystal array a count of the counter values output by the second circuit for the pixel.

For each of a plurality of imaging intervals, the third circuit accumulates the count of the counter values output by the second circuit for each pixel. The apparatus includes a controller which zeros the count for each pixel at or near the beginning of each imaging interval and which transfers the count for each pixel to an imaging system at or near the end of each imaging interval.

The first circuit includes a binary storage which stores a binary sequence for each pixel of the crystal array and which outputs the binary sequence for each pixel when the pixel signal output by the pixel has the predetermined relation to the reference signal. A digital-to-analog converter converts each binary sequence output by the binary storage into a corresponding threshold signal.

The second circuit includes a comparator which outputs the trigger signal having a value related to the peak value of each pixel signal and having the predetermined relation to the reference signal and the threshold signal related to the pixel signal. An event counter outputs each counter value as a function of the value of the trigger signal.

The third circuit includes an event counter having a plurality of registers each of which corresponds to one of the pixels in the crystal array. Each register stores the count related to the number of counter values output by the second circuit for the corresponding pixel in the crystal array.

Lastly, we have invented a method of processing gamma ray events detected by a crystal array which includes a plurality of pixels each of which outputs a pixel signal in response to receiving a gamma ray. The method includes outputting a threshold signal for each pixel in the crystal array which generates a pixel signal having a predetermined relation to a reference signal. A counter value is output for each pixel signal having a predetermined relation to its threshold signal. Lastly, for each pixel of the pixel array, a count is accumulated of the counter values output therefore.

The step of outputting a threshold signal can include the steps of outputting a binary sequence for each pixel in the crystal array which generates a pixel signal having the predetermined relation to the reference signal and converting each binary sequence into the threshold signal.

The step of outputting the counter value can include outputting each pixel signal having the predetermined relation to the reference signal. A trigger signal having a value related to the value of the pixel signal and its threshold signal is output, and each counter value is output as a function of the value of its trigger signal.

DESCRIPTION OF THE PREFERRED EMBODIMENTS

The invention will be described with reference to the accompanying FIGS. where like reference numbers correspond to like elements.

Figure 1:
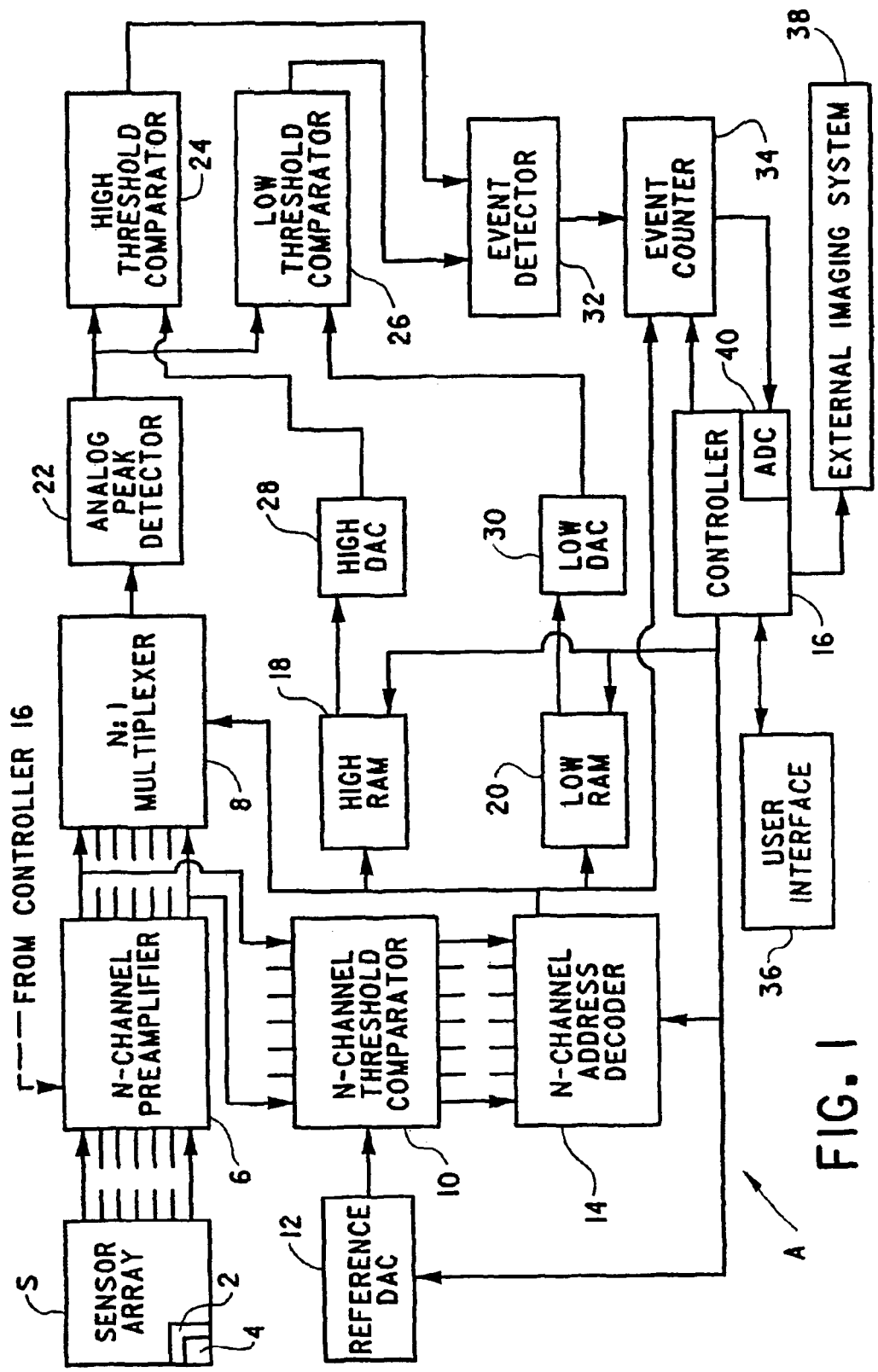
FIG. 1 is a block diagram of a high-speed pulse discriminating gamma ray camera in accordance with a first embodiment of the present invention.

With reference to FIG. 1, a first embodiment of a high-speed pulse discriminating gamma ray camera A in accordance with the present invention includes a sensor array S formed from a plurality of cadmium-zinc-zelluride pixilated crystals 2 arranged in a rectilinear manner. Each crystal 2 defines one or more pixels 4 of sensor array S. Each pixel 4 has an output connected to an input of a multi-channel preamplifier 6. When a gamma ray strikes a pixel 4, a pixel signal in the form of an electrical charge related to the energy of the received gamma ray is generated which is received at the corresponding input of preamplifier 6 which converts the charge into a corresponding voltage.

Each input of preamplifier 6 has a corresponding output which is connected to a corresponding input of an N:1 multiplexer 8 and to a corresponding input of an N-channel threshold comparator 10. Each input of comparator 10 has a corresponding output. A reference digital-to-analog converter (DAC) 12 supplies a reference voltage to comparator 10 for comparison with the voltage received at each input thereof from the corresponding output of preamplifier 6. When the voltage received at an input of comparator 10 has a predetermined relation to the reference voltage, a trigger signal is generated on the corresponding output of comparator 10. More specifically, when the voltage received at an input of comparator 10 exceeds the reference voltage, the trigger signal is generated on the corresponding output of comparator 10.

Preferably, for each output of comparator 10, the presence of a trigger signal is represented by the corresponding output of comparator 10 being in one binary state while the absence of a trigger signal is represented by the corresponding output of comparator 10 being in the other binary state. Other arrangements could also be utilized.

Each output of comparator 10 is connected to an input of a corresponding N-channel address decoder 14. Address decoder 14 includes a unique address signal for each input thereof. Under the control of a controller 16, address decoder 14 outputs, one at a time, the unique address signal for each input of address decoder 14 receiving a trigger signal. Controller 16 also controls the reference voltage output by reference DAC 12.

Each address signal output by address decoder 14 is received by multiplexer 8, a High random access memory (RAM 18 and a Low RAM 20. As discussed above, each output of preamplifier 6 is connected to a corresponding input of multiplexer 8. However, only the output of preamplifier 6 corresponding to the address signal output by address decoder 14 is connected to an output of multiplexer 8. More specifically, at appropriate times, multiplexer 8 receives from address decoder 14 the address signals related to each output of comparator 10 outputting a trigger signal. In response to receiving each address signal, multiplexer 8 connects the output of preamplifier 6 corresponding to the address signal to the output of multiplexer 8.

The output of multiplexer 8 is connected to an analog peak detector 22. For each address signal, analog peak detector 22 outputs the peak voltage of the corresponding output of multiplexer 8. The output of analog peak( detector 22 is connected to an input of a High threshold comparator 24 and to an input of a Low threshold comparator 26. High threshold comparator 24 compares each voltage received from analog peak detector 22 to an upper voltage threshold for the corresponding pixel. Low threshold comparator 26 compares each voltage received from analog peak detector 22 to a lower voltage threshold for the corresponding pixel.

Specifically, High RAM 18 and Low RAM 20 include a first binary sequence and a second binary sequence, respectively, for each pixel of sensor array S. More specifically, High RAM 18 contains a first binary sequence corresponding to the upper voltage threshold for each pixel and Low RAM 20 contains a second binary sequence corresponding to the lower voltage threshold for each pixel. In response to receiving an address signal from address decoder 14, High RAM 18 and Low RAM 20 output the respective first binary sequence and second binary sequence for the pixel 4 of sensor array S causing address decoder 14 to output the address signal. Each first binary sequence and each second binary sequence output by High RAM 18 and Low RAM 20 are received by a High DAC 28 and a Low DAC 30, respectively. For each first binary sequence received thereby, High DAC outputs a corresponding upper voltage threshold to High threshold comparator 24. Similarly, for every second binary sequence received thereby, Low DAC 30 outputs a corresponding lower voltage threshold to Low threshold comparator 26.

High threshold comparator 24 compares the peak voltage output by analog peak detector 22 for each pixel which causes comparator 10 to generate a trigger signal to address decoder 14 to the upper voltage threshold for that pixel. High threshold comparator 24 outputs a binary trigger signal that is in one state when the voltage output by analog peak detector 22 is greater than the upper voltage threshold for the pixel and which is in the other binary state when the voltage output by analog peak detector 22 is less than the upper voltage threshold for the pixel. Similarly, Low threshold comparator 26 compares the voltage output by analog peak detector 22 for each pixel which causes comparator 10 to generate a trigger signal to address decoder 14 to the lower voltage threshold trigger for the pixel. Low threshold comparator 26 outputs a binary signal that is in one binary state when the voltage output by analog peak detector 22 is greater than the lower voltage threshold for the pixel and is in the other binary state when the voltage output by analog peak detector 22 is less than the lower voltage threshold for the pixel. High threshold comparator 24 has an output connected to one input of an event detector 32 and Low threshold comparator 26 has an output connected to another input of event detector 32. Event detector 32 determines from the binary signals output by High threshold comparator 24 and Low threshold comparator 26 if the peak voltage output by analog peak detector 22 for the pixel is between the upper voltage threshold and lower voltage threshold for that pixel.

An event counter 34 is connected to receive an output of event detector 32 and the address signal from address decoder 14. For each pixel 4 of sensor array S, event counter 34 includes a register which can be addressed by a corresponding address signal output by address decoder 14. If event detector 32 determines that the voltage output by analog peak detector 22 for a pixel 4 is between the upper and lower voltage thresholds for the pixel 4, event detector 32 outputs a counter value for the pixel. In response to the output of a counter value for a pixel 4, event counter 34 increments a count in its register corresponding to the pixel 4. Specifically, each register of event counter 34 accumulates for the corresponding pixel a count of the counter values output by event detector 32 for the pixel during one or more imaging intervals. More specifically, at or near the beginning of each imaging interval, controller 16 zeros the accumulated count value in each register of event counter 34. The duration of each imaging interval is set by controller 16 under the direction of a software program and/or inputs received from a user interface 36, e.g., a keyboard and visual display. This software program also controls the operation of address decoder 14 and reference DAC 12. In addition, the software program can control controller 16 to download into High RAM 18 and Low RAM 20 appropriate binary sequences for each pixel in accordance with the energy of the gamma ray events to be detected by gamma ray camera A.

At or near the end of each imaging interval, controller 16 transfers the count stored in each register of event counter 34 to an external imaging system 38 for processing. Preferably, external imaging system 38 arranges the counts received from event counter 34 for an imaging interval into a two dimensional array corresponding to the position of the corresponding pixels 4 of sensor array S. After processing the counts of the two dimensional array, external imaging system 38 displays these processed counts on a display as one or more colors or shades thereof of an image corresponding to the counts of the array. By displaying the processed counts of the array after each imaging interval, external imaging system 38 can generate a sequence of images corresponding to the gamma ray events received by the pixels 4 of sensor array S during the imaging interval.

Figure 2:
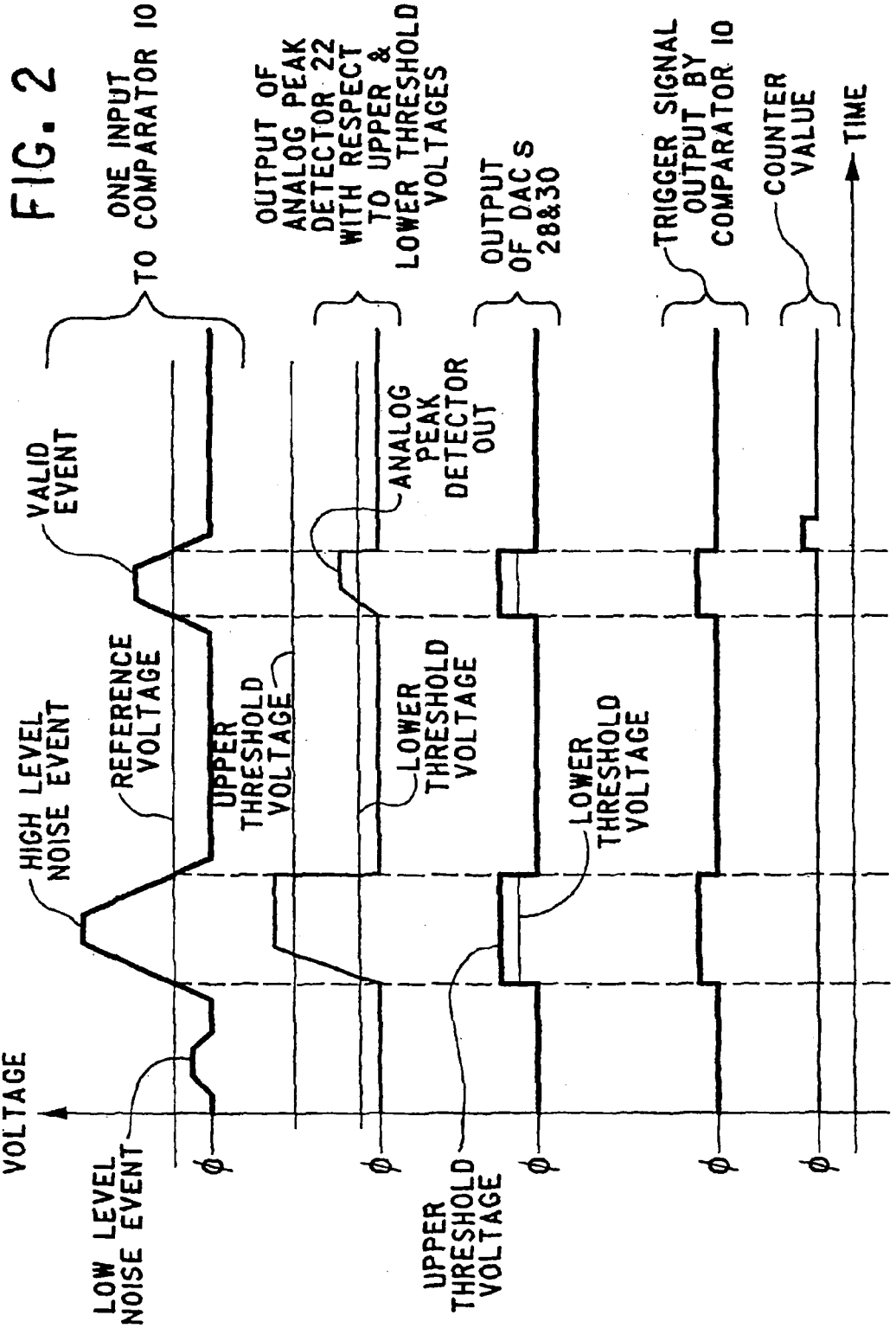
FIG. 2 is a timing diagram of various signals generated by the high-speed pulse discriminating gamma ray camera shown in FIG. 1.

With reference to FIG. 2 and with continuing reference to FIG. 1, a timing diagram of various signals produced by the high-speed pulse discriminating gamma ray camera A of the present invention is shown. As can be seen, when an input of comparator 10 receives a voltage that exceeds the reference voltage, comparator 10 outputs a corresponding trigger signal. In response to this trigger signal, DACs 28 and 30 output corresponding upper and lower threshold voltages which are utilized by high and low threshold comparators 24 and 26 for comparison with the peak of the voltage output by analog peak detector 22. When the output of analog peak detector 22 is greater than the upper threshold voltage or less than the lower threshold voltage, event counter 32 does not output a counter value. However, if the output of analog peak detector 22 is between the upper and lower threshold voltages, event counter 32 outputs a corresponding counter value to event counter 34.

Figure 3:
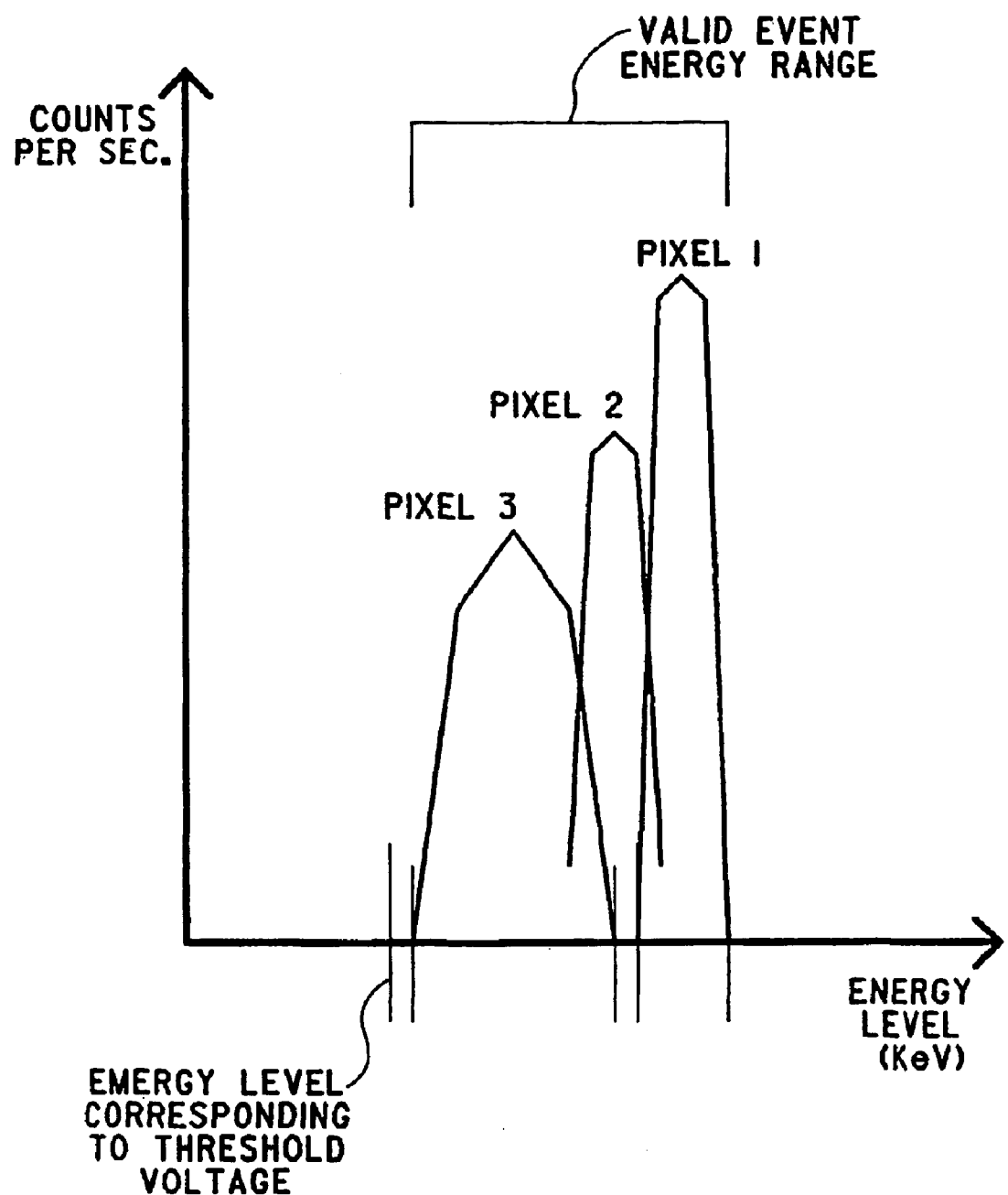
FIG. 3 is a plot of energy level versus counts per second for three pixels of the sensor array of the high-speed pulse discriminating gamma ray camera shown in FIG. 1.

With reference to FIG. 3 and with continuing reference to FIGS. 1 and 2, each pixel 4 of sensor array S can have a different sensitivity to the energy of a gamma ray received thereby. For example, as shown in FIG. 3, a first pixel, e.g. pixel 1, of sensor array S can be responsive to gamma rays having an energy level greater than the energy levels of gamma rays detectable by a third pixel, e.g., pixel 3, of sensor array S. Similarly, a second pixel, e.g. pixel 2, of sensor array S can be sensitive to gamma rays having energy levels between those detectable by pixel 1 and pixel 3. In addition, pixel 2 can be responsive to gamma rays having energy levels that overlap the energy levels of gamma rays detectable by pixel 1 and pixel 3. By utilizing unique upper and lower voltage thresholds for each pixel, the gamma ray camera A can account for the differences in the ability of each pixel to detect gamma rays across different energy levels and improve the detection accuracy of gamma ray camera A by reducing the amount of undesirable noise detected thereby.

Figure 4:
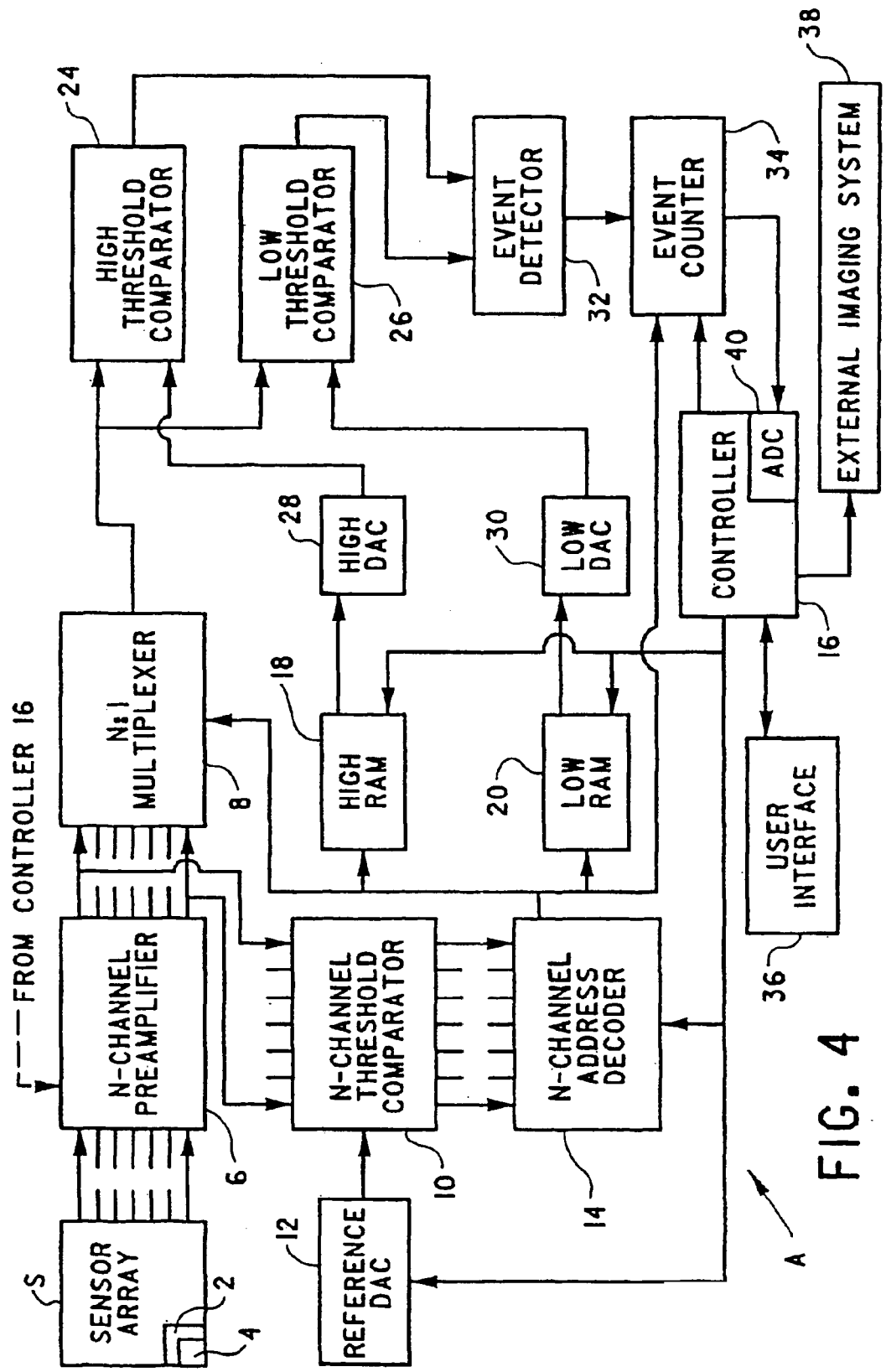
FIG. 4 is a block diagram of a high-speed pulse discriminating gamma ray camera in accordance with a second embodiment of the present invention.

With reference to FIG. 4, a second embodiment of a gamma ray camera A in accordance of the present invention excludes analog peak detector 22, and the output of multiplexer 8 is connected directly to inputs of High threshold comparator 24 and Low threshold comparator 26. In this embodiment, event detector 32 monitors the binary signals output by High threshold comparator 24 and Low threshold comparator 26 for each pixel signal causing comparator 10 to output a trigger signal, for a predetermined interval. If, during each predetermined interval, the voltage output by multiplexer 8 for the pixel remains between the upper and lower voltage thresholds for the pixel, event detector 32 outputs a counter value for the pixel 4. Otherwise, event detector 32 does not output a counter value for the pixel 4. In response to the output of a counter value for a pixel 4, event counter 34 increments the count in the register of event counter 34 corresponding to the pixel 4.

The invention has been described with reference to the preferred embodiments. Obvious modifications and alterations will occur to others upon reading and understanding the preceding detailed description. For example, the sensor array S was described as having cadmium-zinc-zelluride crystals. However, other types of room-temperature detectors, such as cadmium-telluride, mercury-iodide, gallium-arsenide, lead-iodide, and silicon, can also be used. Gamma ray camera A can include an on-board battery and/or an on-board display, thus obviating the need to transfer the counts stored in the registers of event counter 34 to external imaging system 38. Controller 16 can be communicatively connected to external imaging system 38 by conductive wires and/or optical fibers or by wireless communication. The gain of each channel of preamplifier 6 can be adjusted under the control of controller 16, thereby enabling gamma ray camera A to detect a wider range of isotopes. To further enable gamma ray camera A detect a wider range of isotopes, High RAM 18 and Low RAM 20 can be programmed by controller 16 with different binary sequences related to the energies of the gamma ray events to be detected and processed by gamma ray camera A. Preferably, controller 16 includes an analog-to-digital converter (ADC) 40 which can be utilized selectively to monitor the voltages output by analog peak detector 22, High DAC 28, Low DAC 30, reference DAC 12 and/or the on-board battery for propose of self test and calibration. Under the control of controller 16, a multiplexer (not shown) can be utilized to selectively connect the outputs of analog peak detector 22, High DAC 28, Low DAC 30, reference DAC 12 and/or the on-board battery to ADC 40 for monitoring the voltage output thereby. Lastly, gamma ray camera A can include a DAC controlled high voltage power supply for biasing crystals 2 of sensor array S under the control of controller 16 thereby enabling gamma ray camera A to set optimum bias voltage conditions for all types of detectors and operational conditions. It is intended that the invention be construed as including all such modifications and alterations insofar as they come within the scope of the appended claims or the equivalents thereof.

We claim:

1. An apparatus for processing gamma ray events, the apparatus comprising:
   a pixilated crystal array, each pixel of the crystal array responsive to a gamma ray received thereby for outputting a pixel signal related to the energy of the received gamma ray;
   means responsive to each pixel signal for outputting a first threshold signal and second threshold signal related to a position of each pixel in the crystal array when the pixel signal has a predetermined relation to a reference signal;
   means responsive to each pixel signal and its related first and second threshold signals for outputting a counter value when the pixel signal has a predetermined relation to the first and second threshold signals;
   an event counter having an array of registers, each of which is related to one of the pixels of the crystal array, with the event counter responsive to each counter value for incrementing a value of the register related to the pixel of the crystal array outputting the pixel signal related to the counter value; and
   means for displaying the values in the registers as an image.

2. The apparatus as set forth in claim 1, wherein the means for outputting the first and second threshold signals includes:
   a preamplifier responsive to each pixel signal output by a pixel of the crystal array for outputting for each pixel signal a voltage related to the energy of the received gamma ray;
   a threshold comparator responsive to each voltage output by the preamplifier having a predetermined relation to the reference signal for outputting for each voltage a unique trigger signal;
   a channel address decoder responsive to each unique trigger signal for outputting for each unique trigger signal a unique address signal;
   means responsive to each address signal for outputting for each address signal related first and second binary sequences; and
   means responsive to each first and second binary sequence for outputting the first and second threshold signals.

3. The apparatus as set forth in claim 2, wherein:
   the means for outputting the first and second binary sequences includes first and second random access memories; and
   the means for outputting the respective first and second threshold signals includes first and second digital-to-analog converters.

4. The apparatus as set forth in claim 1, wherein:
   the first and second threshold signals are first and second voltage thresholds; and
   the means for outputting a counter value includes:
   means for comparing a voltage related to the pixel signal to the first and second voltage thresholds, wherein the means for comparing outputs a first trigger signal related to the comparison of the voltage related to the pixel signal to the first voltage threshold, and wherein the means for comparing outputs a second trigger signal related to the comparison of the voltage related to the pixel signal to the second voltage threshold; and
   an event detector for outputting the counter value as a function of the first and second trigger signals.

5. The apparatus as set forth in claim 4, wherein the means for comparing includes first and second comparators for comparing the first and second voltage thresholds, respectively, to the voltage related to the pixel signal.

6. The apparatus as set forth in claim 1, further including a controller for controlling at least one of (i) a value of the reference signal, (ii) the values of the first and second threshold signals for each pixel signal, and (iii) the transfer of the values in the registers of the event counter to the means for displaying.

7. The apparatus as set forth in claim 6, further including a reference digital-to-analog converter responsive to controller for outputting the reference signal.

8. An apparatus for processing gamma ray events detected by a crystal array which includes a plurality of pixels each of which outputs a pixel signal in response to receiving a gamma ray, the apparatus comprising:
   a first circuit which outputs for each pixel of the crystal array, when a pixel signal output by the pixel has a predetermined relation to a reference signal, a threshold signal related to the position of the pixel in the crystal array;

a second circuit which outputs a counter value for each pixel signal having a predetermined relation to its threshold signal; and a third circuit which accumulates for each pixel of the crystal array a count of the counter values output by the second circuit for the pixel.

9. The apparatus as set forth in claim 8, wherein, for each of a plurality of imaging intervals, the third circuit accumulates the count of the counter values output by the second circuit for each pixel.

10. The apparatus as set forth in claim 9, further including a controller which zeros the count for each pixel at or near the beginning of each imaging interval and which transfers the count for each pixel to an imaging system at or near the end of each imaging interval.

11. The apparatus as set forth in claim 8, further including a digital-to-analog converter for outputting the reference signal.

12. The apparatus as set forth in claim 8, wherein the first circuit includes:

an binary storage which stores a binary sequence for each pixel of the crystal array and which outputs the binary sequence for each pixel when the pixel signal output by the pixel has the predetermined relation to the reference signal; and a digital-to-analog converter which converts each binary sequence output by the binary storage into a corresponding threshold signal.

13. The apparatus as set forth in claim 8, wherein the second circuit includes:

a comparator which outputs a trigger signal having a value related to the value of each pixel signal having the predetermined relation to the reference and the threshold signal related to the pixel signal; and an event detector which outputs each counter value as a function of the value of the trigger signal.

14. The apparatus as set forth in claim 13, wherein:

the first circuit outputs for each pixel of the crystal array, when the pixel signal output by the pixel has the predetermined relation to the reference signal, first and second threshold signals each related to the position of the pixel in the crystal array;

the comparator outputs first and second trigger signals each having a value-related to the peak value of the pixel signal and its respective first and second threshold signals; and the event detector outputs each counter value as a function of the values of the first and second trigger signals.

15. The apparatus as set forth in claim 8, wherein the third circuit includes an event counter having a plurality of registers each of which corresponds to one of the pixels in the crystal array, each register storing the count related to the number of counter values output by the second circuit for the corresponding pixel in the crystal array.

16. A method of processing gamma ray events detected by a crystal array which includes a plurality of pixels each of which outputs a pixel signal in response to receiving a gamma ray, the method comprising the steps of:

(a) outputting a threshold signal for each pixel in the crystal array which generates a pixel signal having a predetermined relation to a reference signal;

(b) outputting a counter value for each pixel signal having a predetermined relation to its threshold signal; and (c) accumulating for each pixel of the crystal array a count of the counter values output therefor.

17. The method as set forth in claim 16, wherein step (a) includes the steps of:

outputting a binary sequence for each pixel in the crystal array which generates a pixel signal having the predetermined relation to the reference signal; and converting each binary sequence into the threshold signal.

18. The method as set forth in claim 16, wherein step (b) includes the steps of:

outputting each pixel signal having the predetermined relation to the reference signal;

outputting a trigger signal having a value related to the value of the signal and its threshold signal; and outputting each counter value as a function of the value of its trigger signal.

19. The method as set forth in claim 18, wherein step (a) includes the steps of:

outputting first and second threshold signals for each pixel in the crystal array which generates a pixel signal having a predetermined relation to the reference signal;

outputting first and second trigger signals each having a value related to the peak value of the pixel signal and its respective first and second threshold signals; and outputting each counter value as a function of the values of the first and second trigger signals.

* * * * *